April 23, 1957 W. E. BRILL 2,789,549
ARTICULATED ENGINE CAM SHAFT AND ACCESSORY SYSTEM
Filed May 14, 1954 5 Sheets-Sheet 1

INVENTOR
William E. Brill
BY S. C. Thorpe
ATTORNEY

INVENTOR
William E. Brill
BY S. C. Thorpe
ATTORNEY

April 23, 1957  W. E. BRILL  2,789,549
ARTICULATED ENGINE CAM SHAFT AND ACCESSORY SYSTEM
Filed May 14, 1954  5 Sheets-Sheet 4
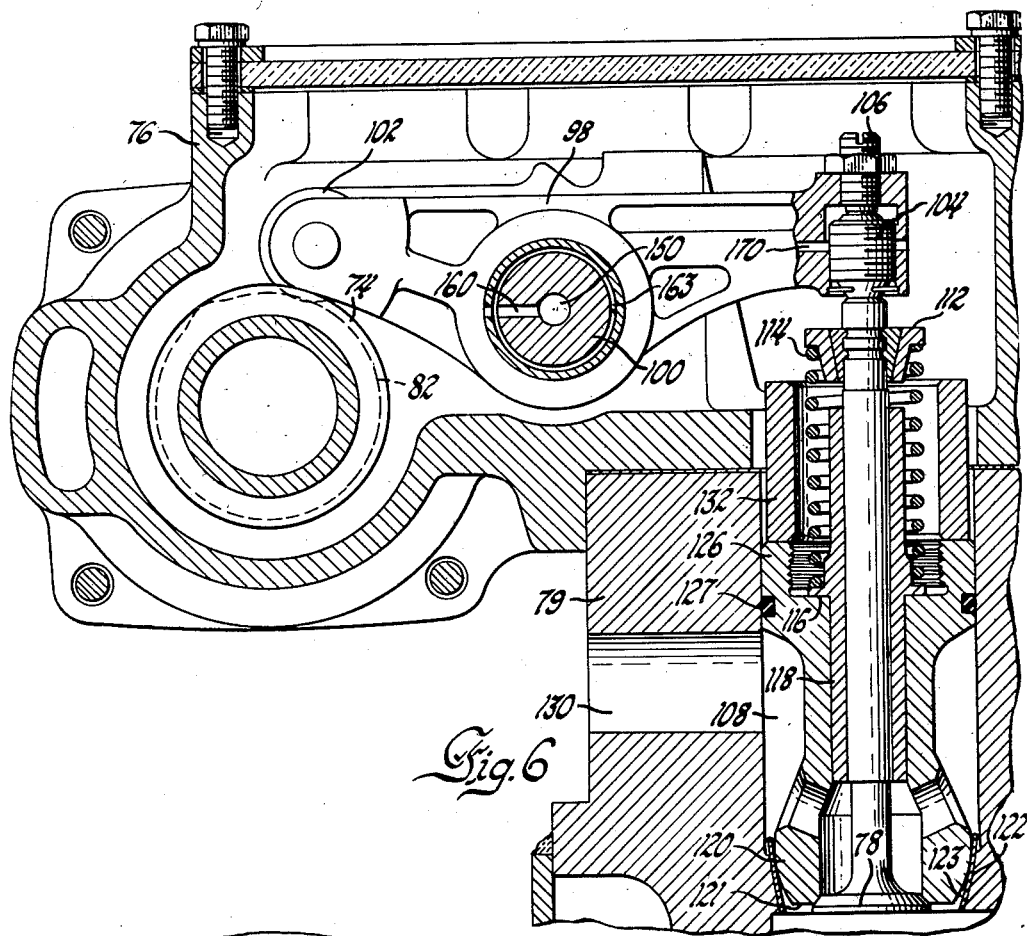
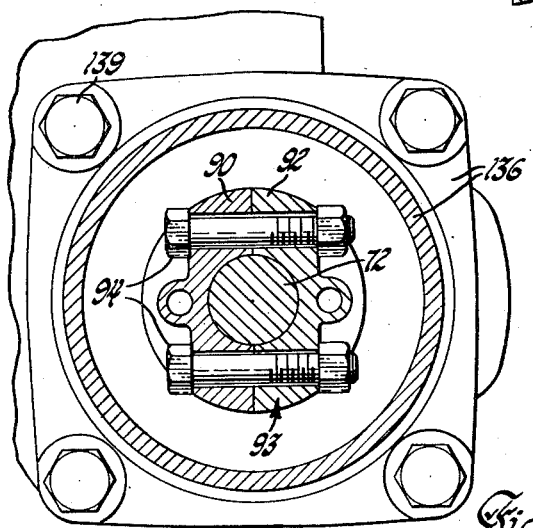
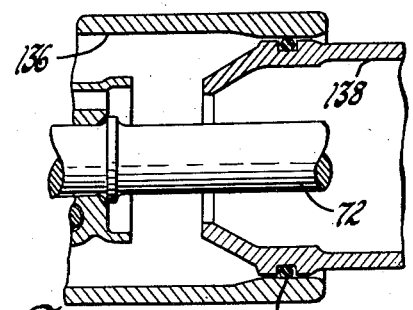
INVENTOR
William E. Brill
BY J. C. Thorpe
ATTORNEY April 23, 1957 W. E. BRILL 2,789,549
ARTICULATED ENGINE CAM SHAFT AND ACCESSORY SYSTEM
Filed May 14, 1954 5 Sheets-Sheet 5

INVENTOR
William E. Brill
BY
ATTORNEY

United States Patent Office 2,789,549
Patented Apr. 23, 1957

2,789,549

ARTICULATED ENGINE CAM SHAFT AND ACCESSORY SYSTEM

William Elmer Brill, Cleveland, Ohio, assignor to General Motors Corporation, Detroit, Mich., a corporation of Delaware Application April 14, 1954, Serial No. 423,110

12 Claims. (Cl. 123—90)

This invention relates to an accessory drive and more particularly to a valve or fuel injector actuating cam mechanism for an internal combustion engine.

It is one of the principal objects of this invention to provide an articulated cam shaft mechanism which allows for thermal expansion, vibration and deflection of various elements of the system and which is capable of operation with misalignment of the various elements.

It is a further object of this invention to provide such an articulated cam shaft mechanism in which intermediate parts may be disasssembled and replaced without dismantling the whole of the mechanism.

It is a still further object of this invention to provide a telescopic housing for such a cam shaft mechanism which permits of misalignment of the cam shaft elements and allows for thermal expansion, vibration and deflection.

The invention has particular application to relatively large heavy-duty engines of the type having individual cylinders. The use of this invention in such engines will permit the removal of individual cylinders from the engine without removal of the cam mechanism from adjacent cylinders. The invention is not limited in its use to engines of this particular type, however, and is considered adaptable to the internal combustion engines generally as well as to other applications presenting similar problems.

The invention comprises rotatable valves or injector actuating cams journaled in individual cam-and-rocker-arm boxes mounted in spaced relation to one another over the valve or fuel injectors of the individual engine cylinders and the individual cams being connected to interconnected driving shafts by slidable telescopic universal connections. Suitable gearing serves to provide a driven connection with the engine crank shaft and telescoping housing members allow for misalignment of the cam-and-rocker-arm boxes while permitting thermal expansion, vibration and deflection to occur between the various members of the system.

Other objects and advantages of the invention will be more thoroughly understood from the following description of a preferred embodiment thereof, in which reference is made to the attached drawings, in which:

Figure 6 is a sectional view taken on the line 6—6 of Figure 1.

Figure 7 is a sectional view taken on the line 7—7 of Figure 8.

Figure 9 is a fragmentary axial section showing a portion of the articulated telescopic housing.

Figure 1:
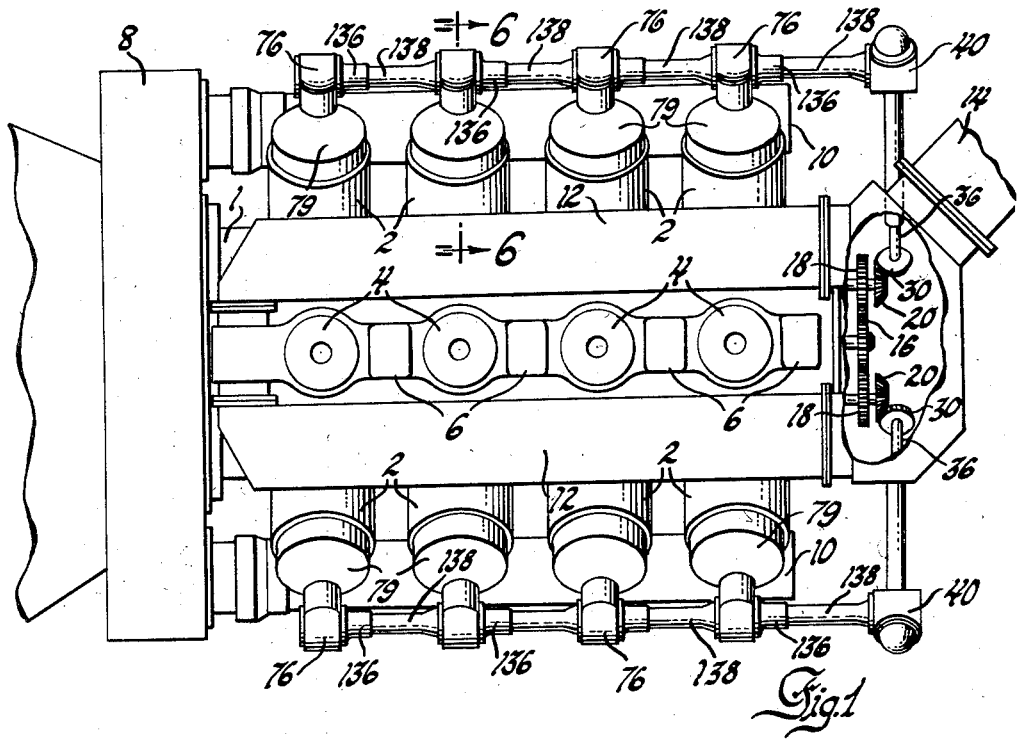
Figure 1 shows, by way of example, a large heavy duty X-type radial engine in which, an accessory drive constructed in accordance with my invention is utilized, and shows a diagrammatic broken-away view of the engine accessory drive gears.
Figure 2:
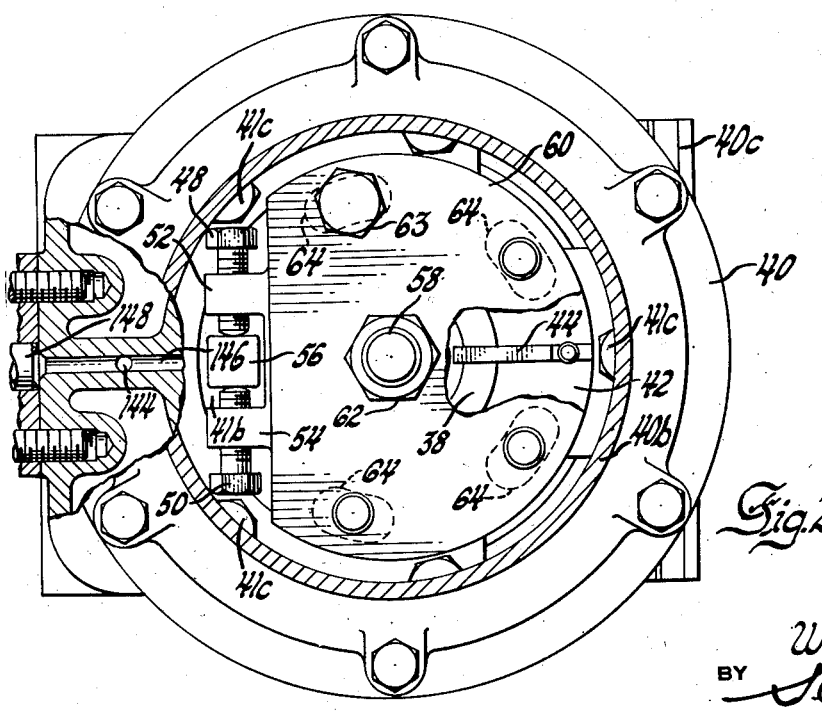
Figure 2 is a cross-sectional view taken substantially along the plane of line 2—2 of Figure 3.

Referring to the drawings in more detail, the engine illustrated in Figure 1 comprises a crankcase 1 having individual cylinders 2 suitably attached thereto. Covers 4 and 6, respectively, are provided for access and lubrication drain openings in the crankcase. An annular header 8 located at one end of the engine supplies scavenging and combustion air to the individual engine cylinders through the intake manifolds 10 and exhaust manifolds 12 connecting with a common exhaust header 14 serve to convey exhaust gases from the engine cylinders.

Figure 4:
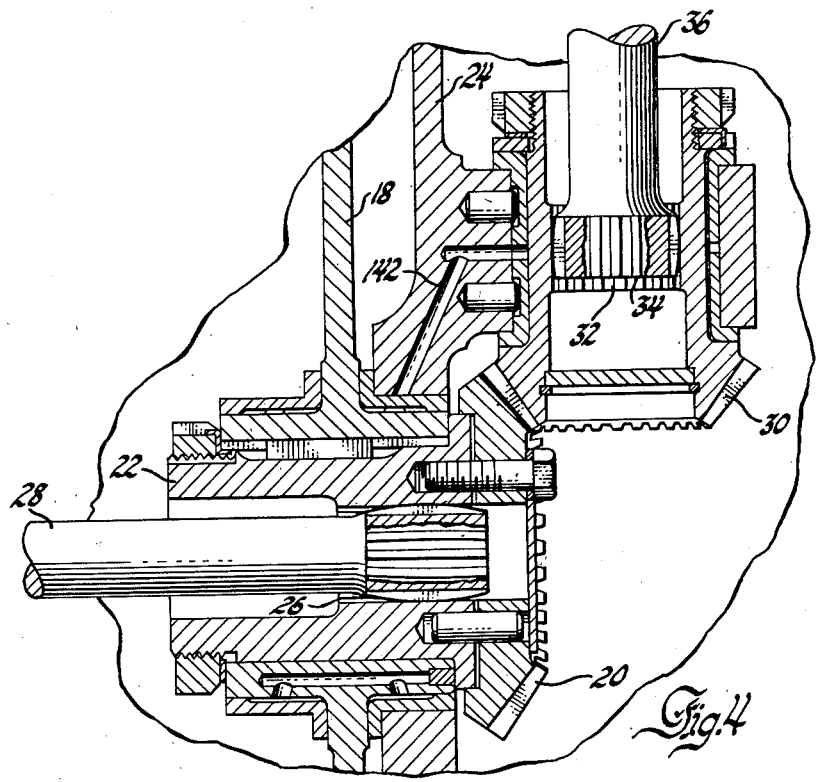
Figure 4 is another sectional view of the right angle drive taken at the accessory gear end of the drive.

As shown by Figures 1 and 4, the right angle drive for the articulated cam shaft system of the present invention includes an accessory gear train comprising a crankshaft driven spur gear 16 and spur gears 18 which serve to drive the bevel gears 20. Each set of gears 18 and 20 is suitably secured to a hub 22 and are properly journaled in the end plate 24 of the engine crankcase. The hub 22 is provided with an axially extending bore therethrough which is provided with internal splines as at 26. A shaft 28 having barrel-shaped external involute splines mating with the splines of the hub 22 serves to drive engine accessories other than the engine actuating mechanism. The bevel gears 20 serve to drive the bevel gears 30, which are also journaled in the crankcase end plate 24 normal to the axis of the gear 20. The bevel gears 30 are internally splined as at 32 to the barrel-shaped splines 34 formed on one end of the shafts 36.

Figure 3:
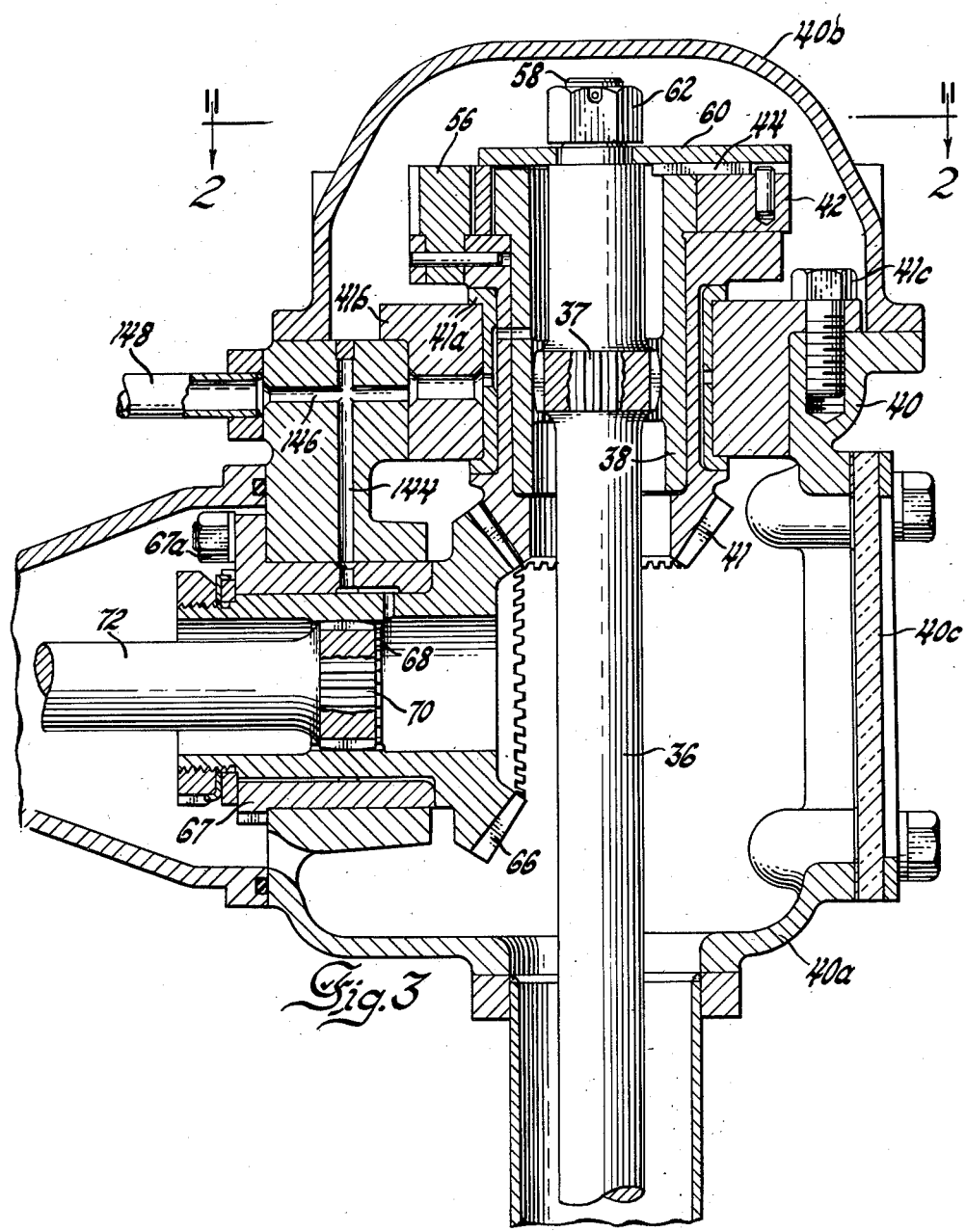
Figure 3 is a sectional view of the right angle drive for the articulated cam shaft system.

Each of the shafts 36 also has barrel-shaped splines 37 adjacent its opposite end, as shown in Figure 3, mating with internal splines formed on a sleeve member 38 which is located in the gear-and-timing box 40. The gear-and-timing box 40 includes a main body portion 40a which is provided with suitable cover members 40b and 40c. A bevel gear 41 rotatively embraces the sleeve 38 and is suitably journaled in the housing 40 by the bearing 41a and the bearing carrier 41b. The bearing carrier 41b is secured to the housing 40 by one or more bolts 41c. A timing plate 42 mounted on the sleeve 38 is prevented from rotating relatively thereto by a shear pin 44 which is wedged into aligned transverse slots formed in the end faces of the sleeve 38 and the timing plate 42.

With the cover member 40b removed from the main body 40a of the gear-and-timing box, the angular relationship of the gear 41 to the shaft 36 and the sleeve 38 is adjustable by the turning of timing screws 48 and 50 which are threadably mounted in bifurcated arms 52 and 54 on the timing plate 42. As shown in both Figures 3 and 4, adjustment of the screws 48 and 50 serves to shift pin 56 which is rigidly carried by the gear 41, angularly to adjust the timing of the cam shaft mechanism driven by the gear as explained below. The screws 48 and 50 also serve to maintain the gear 41 in non-rotatable relation to the timing plate 42 and the sleeve 38.

The shaft 36 is provided with a threaded portion 58 of reduced diameter which projects beyond the end faces of the sleeve 38 and the timing plate 42. A plate 60 fits over this reduced end portion of the shaft 38 and is maintained thereon by a cotter-pin-locked nut 62. The plate 60 is also bolted to the gear 41 by a plurality of angularly spaced bolts 63. The timing plate 60 is provided with arcuate slots 64 for the bolts 63 to permit the angular adjustment of the timing plate 42 by the adjusting screws 48 and 50.

A second bevel gear 66 is journaled in the housing 40 by a bearing member 67 which is secured to the main body 40a by bolts 67a. The gear 66 is in mating right angle relation to the bevel gear 41 and has an axial bore extending thereto which is internally splined as at 68 to the barrel-shaped splines 70 formed on one end of the shaft 72.

Figure 8:
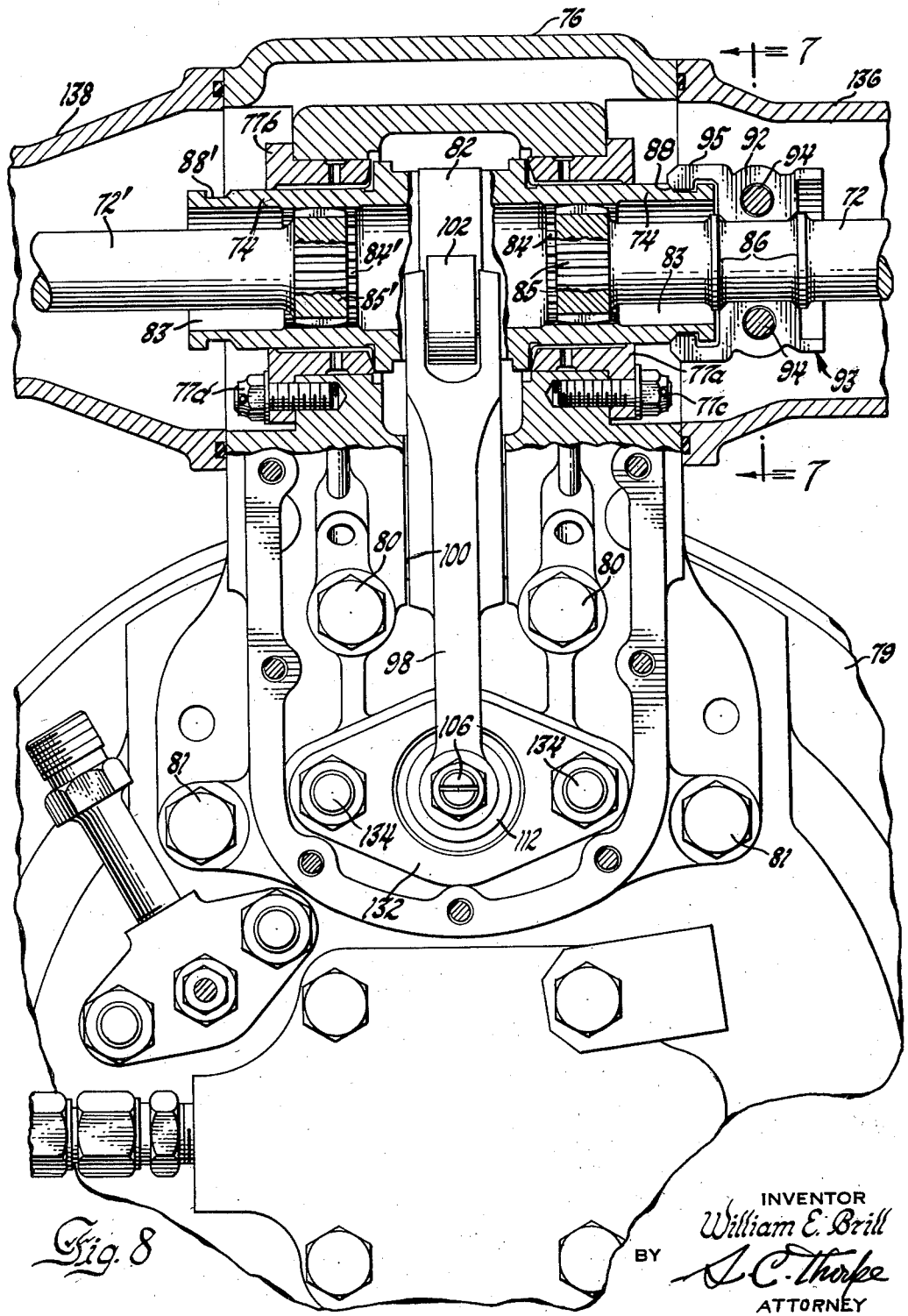
Figure 8 is a top view of the actuating cam assembly mounted on the engine cylinder head in a broken-away section.

As shown by Figures 1, 6, and 8, cam-and-rocker-arm boxes 76 are mounted on an individual cylinder head 79 by the use of bolts 80 and 81 over the poppet valves 78.

Figure 5:
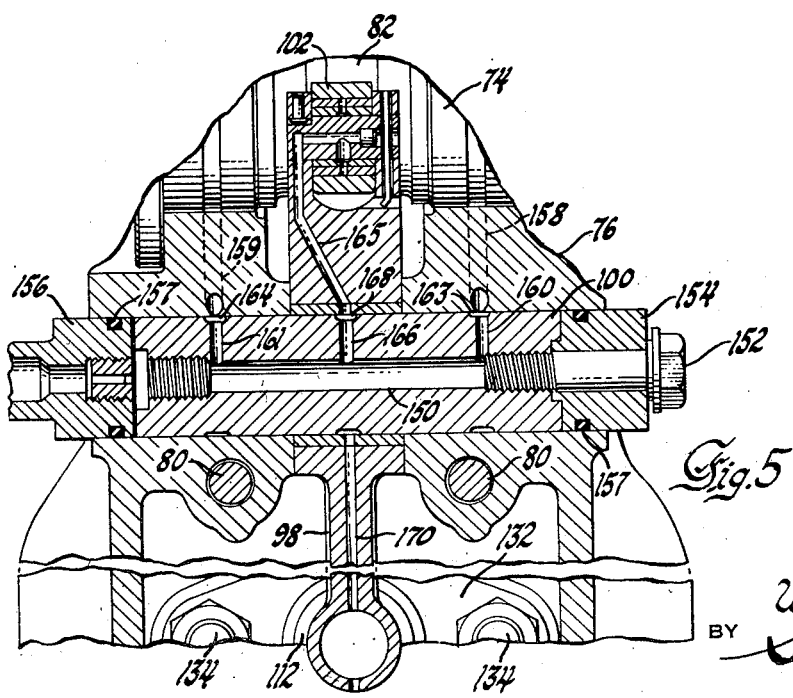
Figure 5 is a combined elevational and cross-sectional top view of the rocker arm and its pivotal mounting in the cam-and-rocker-arm box.

As best shown by Figures 5, 6, and 8, an individual valve-actuating cam cylinder 74 having a valve-actuating cam 82 formed on the exterior thereof is rotatably mounted in each individual cam-and-rocker-arm box 76 by two bearing members 77a and 77b. These two bearing members 77a and 77b are removably secured to the box 76 by bolts 77c and 77d, respectively. Each of the cam cylinders 74 is provided with an axial bore 83 therethrough which is provided with two splined portions 84 and 84' which are formed within that portion of the cylinder 74 having bearing engagement with the bearings 77a and 77b. The end of the shaft 72 is provided with barrel-shaped splines 85 which mate with the internal splines 84 of the cam cylinder 74.

Segmental clamping members 90 and 92 are bolted together as at 94 to form a clamp 93 provided with shoulder portions engaging two annular bosses 86 which are formed on the shaft 72 immediately adjacent the end of the shaft extending from the bore 83. This clamp is also provided with an axially extending portion 95 which embraces an outwardly facing annular groove 88 formed on the cam cylinder 74 adjacent the end thereof. This clamping arrangement serves to maintain the shaft 72 in proper axial relation to the splined portions 68 and 84 of the gear 66 and of the cam cylinder 74, respectively, while allowing for thermal expansion of various members of the system. Clearance provided between the clamping members 90 and 92 and the groove 88, in conjunction with the barrel-shaped shaft splines, also permits relative axial and angular movement of the shaft 72 relative to the cam cylinder 74 and provides for axial misalignment between the cam cylinder and the gear 66. A second outwardly facing annular groove 88' formed on the cylinder 74 on its opposite end permits reversing of the cam cylinder.

As shown by Figure 8 a second shaft 72' similarly engages the splined portion 84' of the cam cylinder 74 with barrel-shaped splines 85'. The shaft 72' at its opposite end, not shown, will be provided with annular bosses similar to 86 and barrel-shaped splines. The shaft 72' will similarly be maintained in axial driving relation to the cam cylinder in the cam box on the adjacent cylinder.

The cam surface 82 on the cam cylinder 74 serves to oscillate a conventional rocker arm 98 about a spindle 100 mounted in the cam-and-rocker-arm box 76. The cam-engaging arm of the rocker arm is provided with a roller type cam follower 102 and the valve-stem-engaging arm is provided with a conventional hydraulic lifter 104. A screw and nut, as shown at 106, is provided to adjust the hydraulic lifter 104.

The valve mechanism shown in Figure 6 is mounted in a bore 108 formed in the cylinder head 79 and comprises the valve 78 having a reduced stem portion having a washer 112 mounted thereon opposite the valve head for seating one end of the valve spring 114. The other end of the spring 114 is seated against an annular shoulder 116 formed on a valve stem guide bearing 118. The shoulder 116 also serves as an abutment against a valve seat member 120 which embraces the lower portion of the valve stem bearing 118.

The bore 108 immediately adjacent its opening into the engine cylinder is provided with an inwardly inclined shoulder 122 against which the axially curved end portion 121 of the valve seat member 120 is mounted in wedged relation. A frusto-conical washer 123 may be interposed between the shoulder 122 and the end portion of the valve seat member 120. The opposite end 126 of the valve seat member 120 is enlarged into contact with the bore 108 and is sealed therewith by an annular sealing ring 127. Intermediate its ends the valve seat member 120, in conjunction with the bore 108, forms a gas receiving chamber which is connected to an engine manifold by a duct 130. The valve seat member 120 is maintained in wedging relation against the shoulder 122 by an external spring guide member 132 which is secured to the engine head 79 by stud bolts and nuts as shown at 134.

A cam shaft housing interconnecting the individual cam-and-rocker-arm boxes 76 comprises two telescopically arranged tubular members 136 and 138, both of which are bolted to their respective cam-and-rocker-arm boxes as shown at 139. The housing member 136 is relatively short compared to the longer member 138 and is located adjacent the end of the shaft carrying the annular bosses 86 and the clamp 93. The free end of the member 136 is in concentric engagement with the free end of the member 138 and an annular sealing ring 140 is interposed therebetween. This construction provides a slidable universal connection between the two housing members and allows for axial and angular movement of the cam-and-rocker-arm boxes relative to each other.

The means for lubricating the various elements in the cam-and-rocker-arm box includes an axially extending bore 150 in the rocker arm spindle 100. One end of the bore 150 is sealed by the bolt 152 which also serves as a retaining bolt for a sealing plug 154 fitting into the end of the bore provided in box 76 for journaling the spindle and carries a gasket which prevents leakage between the plug and the spindle-journaling bore. The bore 150 at its opposite end connects with an oil delivery conduit from the engine oil pump, not shown. A fitting 156 on the end of the oil delivery conduit extends into the spindle-journaling bore of the cam-and-rocker-arm box 76 and is provided with a gasket 157 which prevents leakage between the bore and the fitting. Passages 158 and 159 formed in the cam-and-rocker-arm box are connected to the oil delivering bore 150 of the spindle by radial passages 160 and 161 and outwardly facing annular grooves 163 and 164, respectively, formed in the spindle. A passage 165 formed in the cam-engaging arm of the rocker arm 98 serves to deliver oil to the bearing surfaces for the cam follower 102 and is connected to the bore 150 by a radial passage 166 and an outwardly facing annular groove 168, both of which are formed in the spindle 100. The valve-engaging arm of the rocker arm is also provided with an oil passage 170 which connects to the annular groove 168 and serves to supply the hydraulic lifter 104 with the necessary fluid.

Proper lubrication for the bevel gear journals is provided by oil passages 142, 144 and 146 which are connected to conduits as at 148 which are connected to the engine oil pump.

While the principal object of the above described cam shaft construction is to accommodate thermal expansion between the various elements of the engine and cam shaft mechanism and to allow for vibration, deflection, and axial movement of the various cylinders relative to one another, this construction has a further advantage in that individual cylinders or cam-and-rocker-arm boxes may be removed from the engine without completely dismantling the cam shaft mechanism. Removal of any one of the individual engine cylinders or cam-and-rocker-arm boxes from the engine may be accomplished in the manner described below. Removal of the bolts 139 permits the short housing member 136 to be telescoped upon the housing member 138. Such telescoping of the housing members exposes the clamp 93 which may then be removed or loosened on the shaft 72. When the annular groove 88 is no longer engaged by the clamp 93 the shaft 72 may be shifted to the right into the cam cylinder engaging the cam cylinder or bevel gear as the case may be which engages the barrel-shaped splines of the shaft 72 at its opposite end. Removal of the bolts securing the housing member 138 to the opposite side of the cam-and-rocker-arm box 76 will permit removal of the box 76 or of the engine cylinder from the engine, though it may be desirable at times to remove the clamp from the end of the shaft 72' to permit its axial movement out of engagement with the cam cylinder 74 before proceeding with the removal of either the box 76 or the cylinder 79.

The foregoing description of the invention is explanatory and various changes in the size, shape and materials as well as in the details of construction may be made within the scope of the appended claims without departing from the spirit of the invention.

I claim:

1. A cam mechanism for an engine having a plurality of cylinders, including a plurality of hollow cylindrical members, means for rotatively mounting one of said members on each engine cylinder, a cam surface formed on the exterior surface of said member and splines formed on the internal surface adjacent each end thereof, a plurality of shafts each of which has splined portions drivingly and universally engaging the splines on the members mounted on adjacent cylinders, and telescopic housing means for said shafts interconnecting said mounting means.

2. A cam mechanism having a plurality of hollow cylindrical members, each of said members having a cam surface formed on the external surface thereof and splines formed on the internal surface adjacent each end thereof, means for individually journaling said cylinders in spaced relation to one another, one or more shafts having splined portions drivingly and universally engaging the splines on at least two of the cylindrical members, and telescopic housing means for said shafts interconnecting said journaling means.

3. A cam mechanism comprising a plurality of individual cylinders, each of said cylinders having a cam surface formed thereon, means for individually and rotatively mounting said cylinders, and means for drivingly interconnecting said cams, said interconnecting means comprising at least one shaft which serves to interconnect adjacent cylinders, telescopic universal joints connecting the ends of each shaft to said adjacent cylinders, and telescopic housing means for said shafts interconnecting said mounting means.

4. In an engine having a plurality of individual cylinder blocks and each of said cylinder blocks having a valve operatively mounted thereon, valve actuating mechanism for said valves comprising, in combination, a cam rotatively mounted on said cylinder block and a plurality of axially spaced shafts, each of said cams having spaced universal splined connections with the adjacent shafts permitting axial misalignment between the cams and permitting axial displacement between said cams and said shafts thereby accommodating thermal expansion and vibrating motion occurring between the cylinder blocks, the cams, and the shafts, and clamping means associated with at least one end of each shaft and one of said cams for limiting axial and angular movement therebetween.

5. A cam mechanism for an engine having a plurality of cylinders comprising a cam rotatively mounted on each cylinder, and means drivingly interconnecting said cams, said means comprising a plurality of shafts each of which is universally and telescopically connected at its end to the cams on adjacent cylinders, and clamping means associated with at least one end of each shaft and one of said cams for limiting axial and angular movement therebetween.

6. A cam mechanism including a plurality of rotary cams, means for individually mounting said cams in spaced relation to one another, means for drivingly interconnecting said cams, said interconnecting means including one or more shafts and universal telescopic joints connecting each shaft to at least two of said cams, and means associated with at least one end of each shaft embracing one of said cams for limiting axial and angular movement therebetween.

7. In an inline multi-cylinder engine, a valve actuating mechanism individually mounted on each cylinder, each of said mechanisms comprising a poppet valve, cam means, and a rocker arm having an arm in thrust relation to the stem of the poppet valve and a cam follower in bearing relation to said cam means, a telescopic articulated cam shaft means drivingly interconnecting said valve mechanisms and being adapted to be driven by the engine crank shaft, and telescopic removable housing means for said cam shaft means interposed between said valve operating mechanisms.

8. In an inline multi-cylinder internal combustion engine, the combination comprising a crankcase, a plurality of individual cylinders mounted on said crankcase, valve actuating mechanism individually mounted on each cylinder, articulated cam shaft means drivingly interconnecting said actuating mechanism, said cam shaft means being adapted to be driven by the engine crank shaft and having valve timing means associated therewith, and telescopic housing means for said cam shaft means interposed between said valve operating mechanisms.

9. In an inline multi-cylinder internal combustion engine, the combination comprising a crankcase, a plurality of individual cylinders mounted on said crankcase, the head end of each cylinder having a housing for a valve actuating mechanism associated therewith, a valve actuating mechanism mounted in each of said housings comprising a valve actuating cam means journalled in each of said housings, telescopic articulated shaft means drivingly interconnecting said cam means and being adapted to be operatively driven by the engine crankshaft, means for limiting axial and angular movement between said cam means and said shaft means, and said telescopic articulated shaft means having timing means associated therewith for varying the timing of the valve actuating cams with respect to the engine crankshaft.

10. The combination set forth in claim 9 including telescopic articulated housing means interposed between the valve actuating housings on adjacent cylinders.

11. An accessory drive for an engine having a plurality of individual cylinder blocks and each of said cylinder blocks having a valve and valve actuating mechanism associated therewith, said accessory drive including a plurality of cam cylinders, at least one of said cam cylinders being journaled on each of said cylinder blocks by a pair of spaced bearings, each of said cam cylinders having a cam surface formed thereon between said bearings adapted to actuate said valve through said valve actuating mechanism, each of said cam cylinders having two axially spaced internally splined portions formed within the bearing journaled portions of said cam cylinder, and a plurality of shafts each having splined end portions drivingly and universally engaging the splines on adjacent cylinders.

12. In an engine having a plurality of individual cylinder blocks, a valve actuating mechanism mounting on the head end of each cylinder block, each of said valve actuating mechanism including a cam rotatively supported by the cylinder block, shaft means drivingly interconnecting said cams on adjacent cylinders, said shaft means including a plurality of axially spaced shafts, each of said cams having axially spaced barrel shaped splined connections with adjacent shafts thereby permitting axial misalignment between the cams and permitting axial displacement between said cams and said shafts thereby accommodating thermal expansion and vibrating motion occurring between the cylinder blocks, the cams, and the shafts.

References Cited in the file of this patent

UNITED STATES PATENTS

| | | |
|---|---|---|
| 857,994 | Green | June 25, 1907 |
| 2,151,834 | Bugatti | Mar. 28, 1939 |
| 2,521,176 | Kutz | Sept. 5, 1950 |

FOREIGN PATENTS

| | | |
|---|---|---|
| 552,053 | France | Apr. 3, 1923 |
| 128,549 | Switzerland | Nov. 1, 1928 |
| 481,340 | Great Britain | Mar. 9, 1938 |